(12) United States Patent
Park et al.

(10) Patent No.: US 7,659,957 B2
(45) Date of Patent: Feb. 9, 2010

(54) LIQUID CRYSTAL DISPLAY PANEL AND FABRICATING METHOD THEREOF

(75) Inventors: Sun Park, Suwon-si (KR); Chun Gi You, Hwasung-si (KR)

(73) Assignee: Samsung Electronics Co., Ltd. (KR)

( * ) Notice: Subject to any disclaimer, the term of this patent is extended or adjusted under 35 U.S.C. 154(b) by 107 days.

(21) Appl. No.: 11/765,201

(22) Filed: Jun. 19, 2007

(65) Prior Publication Data

US 2008/0024708 A1    Jan. 31, 2008

(30) Foreign Application Priority Data

Jul. 31, 2006    (KR) ...................... 10-2006-0072278

(51) Int. Cl.
*G02F 1/1343*    (2006.01)
(52) U.S. Cl. ................... 349/139; 349/42; 349/147
(58) Field of Classification Search ............. 349/42–48, 349/139, 143–148
See application file for complete search history.

(56) References Cited

U.S. PATENT DOCUMENTS

2005/0078240 A1*    4/2005    Murade .................... 349/110
2005/0110924 A1*    5/2005    Kim et al. .................. 349/111
2007/0080349 A1*    4/2007    Hoshino et al. ............... 257/59

FOREIGN PATENT DOCUMENTS

| JP | 11218777 | 8/1999 |
|---|---|---|
| JP | 2003202584 | 7/2003 |
| KR | 1020050087516 | 8/2005 |

* cited by examiner

*Primary Examiner*—Hemang Sanghavi
(74) *Attorney, Agent, or Firm*—Cantor Colburn LLP

(57) ABSTRACT

A liquid crystal display ("LCD") panel and fabricating method thereof capable of minimizing erosion of a common pad of the LCD panel are disclosed. The LCD panel includes a common electrode formed on an upper substrate and a common pad formed on a lower substrate facing the upper substrate, the common pad supplying a common voltage to the common electrode through a short point, wherein the common pad includes a lower electrode formed on the lower substrate, a first common contact hole penetrating a gate dielectric layer formed to cover the lower electrode, an intermediate electrode connected to the lower electrode through the first common contact hole, a plurality of second common contact holes penetrating an organic protection layer formed to cover the intermediate electrode, and an upper electrode connected to the intermediate electrode through the second common contact holes.

11 Claims, 5 Drawing Sheets

LIQUID CRYSTAL DISPLAY PANEL AND FABRICATING METHOD THEREOF

This application claims priority to and the benefit of Korean Patent Application No. 2006-72278, filed Jul. 31, 2006, and all the benefits accruing therefrom under 35 U.S.C. §119, the contents of which in its entirety are herein incorporated by reference.

BACKGROUND OF THE INVENTION (a) Field of the Invention

The present invention relates generally to a liquid crystal display (LCD) panel and fabricating method thereof. More particularly, the present invention relates to an LCD panel and fabricating method thereof, which are capable of minimizing erosion of a common pad.

(b) Description of the Related Art

An LCD is a thin flat display device which presents an image by adjusting the light transmissivity of a dielectric anisotropic liquid crystal. The LCD device includes a plurality of gate lines and a plurality of data lines crossing the gate lines, so as to define a plurality of cells. Each cell is provided with subpixels independently driven by a thin film transistor (TFT). The subpixels charge a difference voltage between a data signal supplied to a pixel electrode through the TFT and a common voltage supplied to a common electrode of a color filter substrate and drive liquid crystal molecules according to the charged voltage such that the light transmissivity is adjusted to implement a gradation depending on the data signal.

In order to apply the common voltage to the common electrode, a short point is needed to connect the common electrode formed on an upper substrate to a common pad formed on a lower substrate. Typically, the short point is formed on a non-display area rather than a display area provided by an adhesive and exposed to the exterior.

Such a short point is formed by coating a conductive paste on the common pad and applying hot press thereon. However, conductive particles within the conductive paste may be broken during the hot press process and thus cracks occur on an upper electrode of the common pad arranged below the conductive paste. Then, moisture or foreign substances permeate into the common pad through the cracks, and lower and intermediate electrodes of the common pad connected to the upper electrode of the common pad are eroded. The erosion of the electrodes distorts the common voltage supplied to the common electrode and further may propagate to a driving circuit formed on a printed circuit board for driving the display area and the signal lines of the display area, resulting in breakage of the signal line.

BRIEF SUMMARY OF THE INVENTION

Aspects of the present invention provide an LCD panel and fabricating method thereof, which are capable of minimizing erosion of a common pad.

In an exemplary embodiment of the present invention, an LCD panel includes a common electrode formed on an upper substrate and a common pad formed on a lower substrate facing the upper substrate, the common pad supplying a common voltage to the common electrode through a short point, wherein the common pad includes a lower electrode formed on the lower substrate, a first common contact hole formed through a gate dielectric layer covering the lower electrode, an intermediate electrode connected to the lower electrode through the first common contact hole, a plurality of second common contact holes formed through an organic protection layer covering the intermediate electrode, and an upper electrode connected to the intermediate electrode through the second common contact holes.

In one aspect, the second common contact holes are formed such that the diameter of at least one of the common second contact holes is smaller than that of the short point.

In another aspect, the organic protection layer is patterned to connect the intermediate electrode and the upper electrode through the plurality of the second common contact holes.

In another aspect, the LCD panel further comprises an inorganic protection layer formed below the organic protection layer, the inorganic layer having the same pattern as the organic protection layer.

In another aspect, the first common contact hole is formed as a plurality of openings.

In another exemplary embodiment of the present invention, a method of fabricating an LCD comprises forming a color filter substrate including a common electrode on an upper substrate, forming a TFT substrate including a common pad on a lower substrate facing the upper substrate, the common pad having a lower electrode, a first common contact hole formed through a gate dielectric layer covering the lower electrode, an intermediate electrode connected to the lower electrode through a the first common contact hole, a plurality of second common contact holes formed through an organic protection layer covering the intermediate electrode, and an upper electrode connected to the intermediate electrode through the second common contact hole, and bonding the color filter substrate to the TFT substrate such that the common electrode is electrically connected to the common pad through a short point.

In one aspect, the second common contact holes are formed such that the diameter of at least one of the second common contact holes is smaller than that of the short point.

In another aspect, the method for fabricating the liquid crystal display panel further comprises forming an inorganic protection layer below the organic protection layer, the inorganic layer having the same pattern as the organic protection layer.

In another aspect, the first common contact hole is formed as a plurality of openings.

In another aspect, the organic protection layer is patterned to connect the intermediate electrode and the upper electrode through the plurality of the second common contact holes.

BRIEF DESCRIPTION OF THE DRAWINGS

The above and other aspects, features and advantages of the present invention will become readily apparent by reference to the following detailed description in conjunction with the accompanying drawings, wherein.

DETAILED DESCRIPTION OF THE INVENTION

Figure 1:
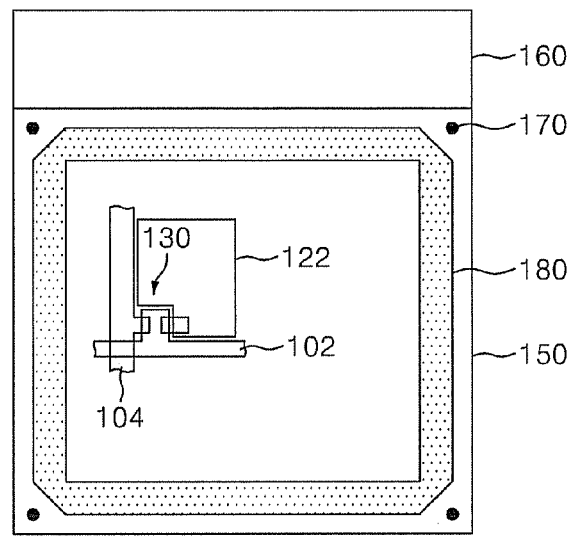
FIG. 1 is a plan view illustrating an LCD panel according to an exemplary embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
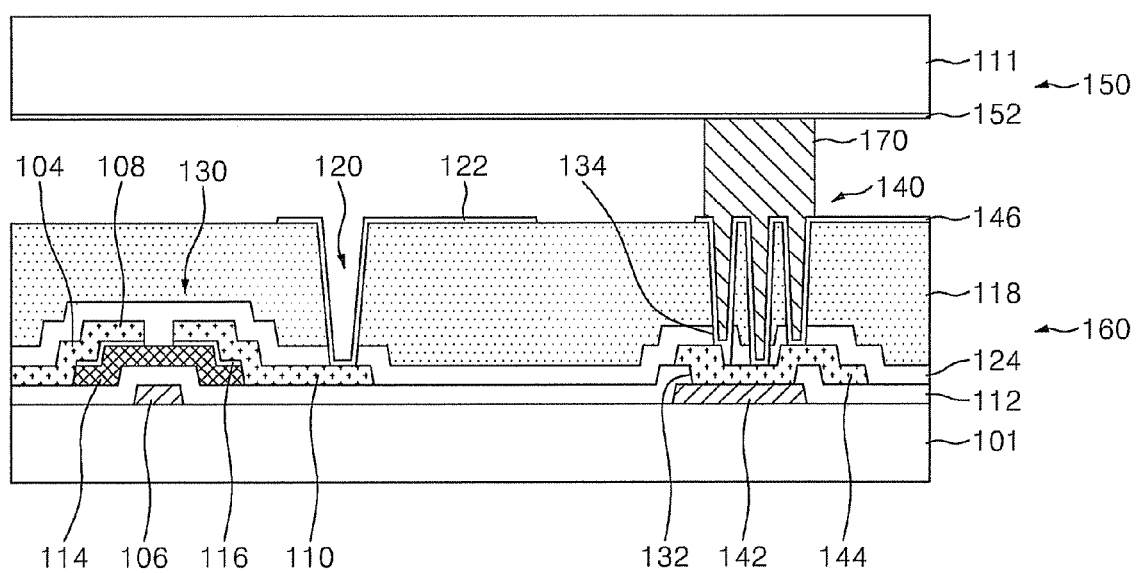
FIG. 2 is a cross sectional view illustrating a first exemplary embodiment of the LCD panel of FIG. 1.

FIG. 1 is a plan view illustrating an LCD panel according to an exemplary embodiment of the present invention, and FIG. 2 is a cross sectional view illustrating a first exemplary embodiment of the LCD panel of FIG. 1, particularly illustrating a subpixel and a short point.

Referring to FIGS. 1 and 2, the LCD panel includes a thin film transistor (TFT) substrate 160 and a color filter substrate 150 which face each other with a liquid crystal material (not shown) disposed therebetween and are bonded to each other by means of an adhesive 180.

The color filter substrate 150 is formed by depositing a black matrix (not shown), a color filter (not shown), and a common electrode 152 on an upper substrate 111. The black matrix is implemented in the form of a matrix on the upper substrate 111. The black matrix divides an area of the upper substrate 111 into a plurality of cell regions in which color filters are formed and prevents optical interferences between adjacent cells and exterior light reflection. The color filter is formed with a red filter region (R), a green filter region (G), and a blue filter region (B) passing red, green, and blue lights, respectively, in the cell regions divided by the black matrix. The common electrode 152 is formed by coating a transparent conductive material over the color filter. A common voltage (Vcom) is supplied to the common electrode 152 through a short point 170 while the LCD panel is driven.

The TFT substrate 160 includes a plurality of cell regions defined by a plurality gate lines and data lines crossing the gate lines. Each cell region includes a TFT 130 coupled with a gate line 102 and a data line 104, a pixel electrode 122 connected to the TFT 130, and a common pad 140 connected to the common electrode 152 through the short point 170.

The TFT 130 selectively supplies a data signal to the pixel electrode 122 through the data line 104 in response to a gate signal supplied through the gate line 102. The TFT 130 includes a gate electrode 106 connected to the gate line 102, a source electrode 108 connected to the data line 104, and a drain electrode 110 connected to the pixel electrode 122. The TFT 130 further includes an active layer defining a channel between the source electrode 108 and the drain electrode 110 while overlapping the gate electrode 106 with a gate dielectric layer 112 disposed therebetween and includes an ohmic contact layer 116 for providing ohmic contact between the active layer 114 and the source and drain electrodes 108 and 110.

After the gate electrode 106 is formed on a lower substrate 101 together with the data line 102, the active layer 114 and the ohmic contact layer 116 are deposited on the gate dielectric layer 112 in a sequential order and then the source and drain electrodes 110 are formed on the ohmic contact layer 116 together with the data line 104. The TFT 130 is connected to the pixel electrode 122 via a pixel contact hole 120 formed through an inorganic protection layer 124 and an organic protection layer 118.

The pixel electrode 122 is connected to the drain electrode 110 of the TFT 130 which is exposed through the contact hole 120 in each subpixel area. If a video signal is supplied through the TFT 130, the pixel electrode 122 forms a vertical electric field with the common electrode 152 charged by the common voltage such that liquid crystal molecules vertically aligned with respect to the TFT substrate 160 and the color filter substrate 150 are twisted by the dielectric anisotropy of the liquid crystal. Depending on the twisted angles of liquid crystals, the light transmissivity transmitting each pixel area varies, correspondingly illuminating the pixel.

The common pad 140 is connected to the common electrode 152 through the short point 170, which is positioned in a non-display region rather than a display region defined by the adhesive 180. Accordingly, the common pad 140 supplies the common voltage from a power source (not shown) to the common electrode 152.

The common pad 140 includes a lower electrode 142 formed on the lower substrate 101, an intermediate electrode 144 connected to the lower electrode 142 through a first common contact hole 132, and an upper electrode 146 connected to the intermediate electrode 144 through a second common contact hole 134.

The lower electrode 142 is formed from the same metal as the gate electrode 106 on the lower substrate 101.

The intermediate electrode 144 of the common pad 140 is connected to the lower electrode 142 through the first common contact hole 132, which exposes the lower electrode 142 by penetrating the gate dielectric layer 112. The intermediate electrode 144 is formed from the same metal as the data line 104 on the same horizontal plane as the data line 104, i.e., on the gate dielectric layer 112.

Figure 3:
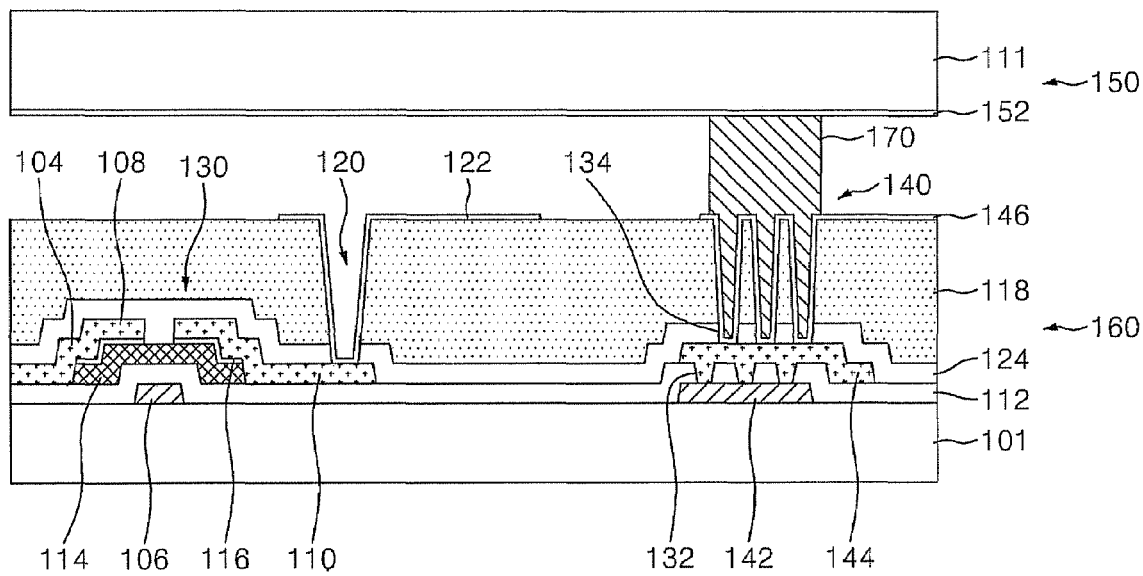
FIG. 3 is a cross sectional view illustrating a second exemplary embodiment of the LCD panel of FIG. 1.

FIG. 3 is a cross sectional view illustrating a second exemplary embodiment of the LCD panel of FIG. 1.

As shown in FIG. 3, the structure of the LCD panel according to the second embodiment is identical to that of the LCD panel according to the first embodiment of FIG. 2, except that the first common contact hole 132 is implemented with a plurality of openings as opposed to a single opening structure in the first embodiment.

By forming the first common contact hole 132 with a plurality of openings, the exposure amount of the side walls of the gate dielectric layer 112 is increased. Accordingly, the intermediate electrode 144 formed on the sidewalls of the gate dielectric layer 112, as well as on upper sides of the gate dielectric layer 112 and the lower electrode 142, has an increased area, wherein the contact resistance between the lower electrode 142 and the intermediate electrode 144 decreases.

In this case, the gate dielectric layer 112 includes a plurality of openings therein to define the first common contact hole 132 on the lower electrode 142. The reduced exposure surface of the lower electrode 142 also decreases the chances of contact with moisture, as well as with the contact surface chemical solution (for example, etchant and strip solution), resulting in improvement of chemical resistance of the lower electrode 142.

The upper electrode 146 is connected to the intermediate electrode 144 through the second common contact hole 134 defined by a plurality of openings exposing the intermediate electrode 144 by penetrating the inorganic protection layer 124 and the organic protection layer 118. At least one of the openings of the second common contact hole 134 is formed such that the diameter of the opening is less than that of the short point 170. The upper electrode 146 is formed from the same metal as the pixel electrode 122 on the same horizontal plane as the pixel electrode 122, i.e., on the organic protection layer 118. The inorganic protection layer 124 and the organic protection layer 118 are deposited on the intermediate electrode 144 through the second common contact hole 134 in a sequential fashion.

The organic protection layer 118 and the inorganic protection layer 124 are formed in an identical pattern on the intermediate electrode 144. Both the organic protection layer 118 and the inorganic protection layer 124 protect the upper electrode 146 from being cracked by absorbing pressure generated during a hot press process of a conductive paste forming the short point 170. The organic protection layer 118 is formed so as to enable the intermediate electrode 144 to contact the upper electrode 146 through a plurality of holes. The inorganic protection layer 124 creates long a channel through which moisture may permeate when cracks occur under the organic protection layer 118. The plurality of openings defining the second common contact hole 134 reduces the size of the exposed surface of the intermediate electrode 144, thereby decreasing the chance that the intermediate electrode 144 is exposed to moisture. Accordingly, the rate of propagation of erosion is reduced and an erosion margin is improved.

The upper electrode 146 is formed on side walls of the organic protection layer 118 and the inorganic protection layer 124 exposed by the plural openings of the second common contact hole 134, as well as on the upper surfaces of the organic protection layer 118, the inorganic protection layer 124, and the intermediate electrode 144 of the common pad 140. Accordingly, since the size of exposed surface of the upper electrode 146 increases, the contact resistance between the intermediate electrode 144 and the upper electrode 146 decreases.

FIGS. 4A to 4G are cross sectional views illustrating an exemplary method for fabricating the LCD panel of FIG. 3, in accordance with an alternative embodiment of the invention.

Figure 4A:
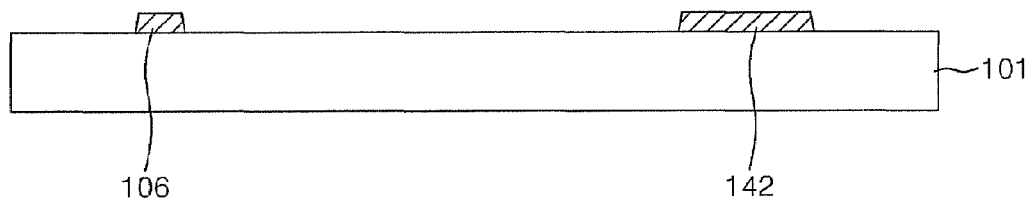
FIGS. 4A to 4G are cross sectional views illustrating an exemplary method of fabricating the LCD panel of FIG. 3, in accordance with an alternative embodiment of the invention.

Referring to FIG. 4A, a gate pattern is formed with a gate electrode 106, a gate line (not shown in FIG. 4A) connected to the gate electrode 106, and a lower electrode 142 on a lower substrate 101.

The gate pattern is formed by depositing a gate metal layer on the lower substrate 101 and patterning the gate metal layer using a photolithography process and an etching process. The gate metal layer can be made from at least one or more of an alloy of aluminum (Al), molybdenum (Mo), copper (Cu), chromium (Cr), titanium (Ti), and combinations thereof. The gate metal layer also can be formed as a single layer or multiple layers.

Figure 4B:
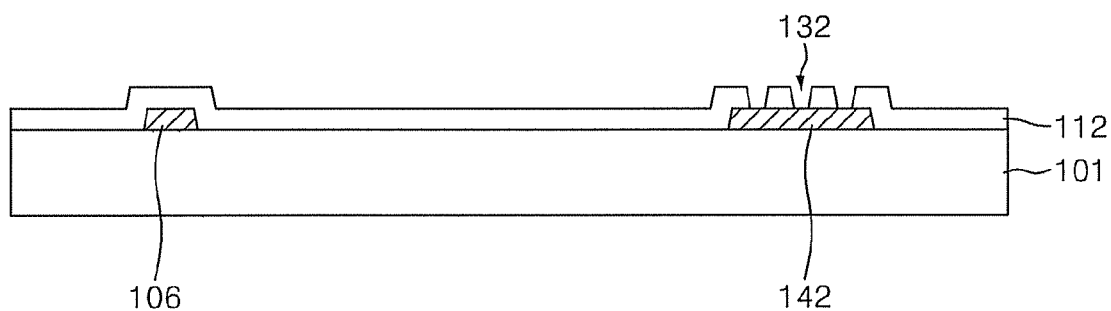

In FIG. 4B, a gate dielectric layer 112 is deposited over the gate pattern on the lower substrate 101 and a first common contact hole 132 defined by a plurality of openings is formed through the gate dielectric layer 112 such that the lower electrode 142 is exposed through the first common contact hole 132.

The gate dielectric layer 112 is formed by depositing an inorganic dielectric material such as $SiN_x$ and $SiO_x$ on the lower substrate 101. The first common contact hole 132 is formed by patterning the gate dielectric layer 112 through photolithography etching processes such that the lower electrode 142 is exposed through the first common contact hole 132.

Figure 4C:
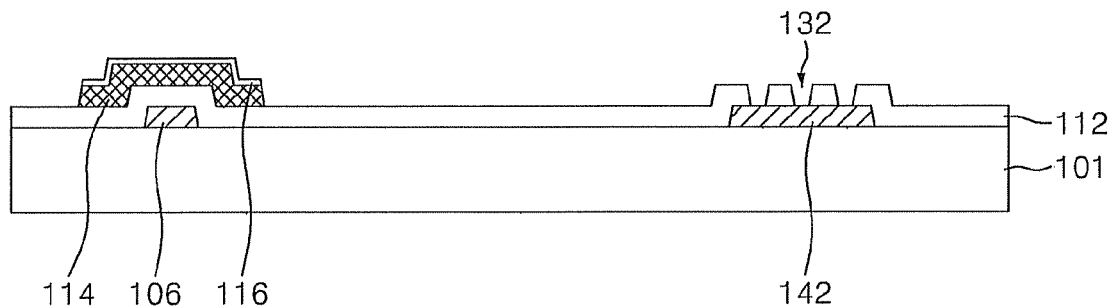

As shown in FIG. 4C, after the first common contact hole 132 is formed, an active layer 114 and an ohmic contact layer 116 are formed on the gate dielectric layer 112 directly above the gate electrode 106 as a semiconductor pattern. The semiconductor pattern is formed by sequentially depositing an amorphous silicon layer and an N+ ion doped amorphous silicon layer on the gate dielectric layer 112 and then patterning the deposited amorphous silicon layer and the N+ ion doped amorphous silicon layer through photolithography and etching processes.

Figure 4D:
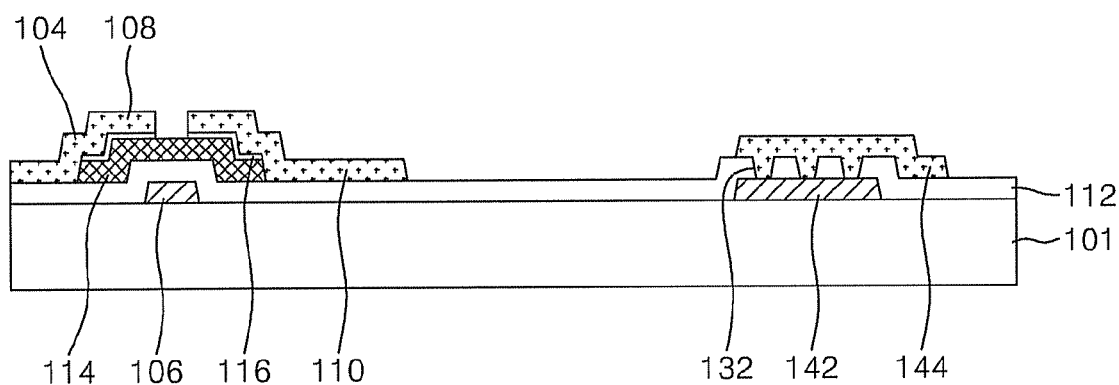

As shown in FIG. 4D, a source/drain pattern including a data line 104 crossing the gate line, a source electrode 108 connected to the data line 104, a drain electrode 110 facing the source electrode 108, and an intermediate electrode 144 connected to the lower electrode 142 is formed on the gate dielectric layer 112 on which the semiconductor pattern is formed.

The source/drain pattern is formed by depositing a source/drain metal layer and then by patterning the source/drain metal layer through the photolithography and etching processes. The source/drain metal layer may be made of at least one or more of an alloy of aluminum (Al), molybdenum (Mo), copper (Cu), chromium (Cr), titanium (Ti), and combinations thereof. The gate metal layer also can be formed as a single layer or multiple layers. After forming the source/drain pattern, the active layer 114 is exposed by removing the ohmic contact layer 116 exposed between the source and drain electrodes 108 and 110.

Figure 4E:
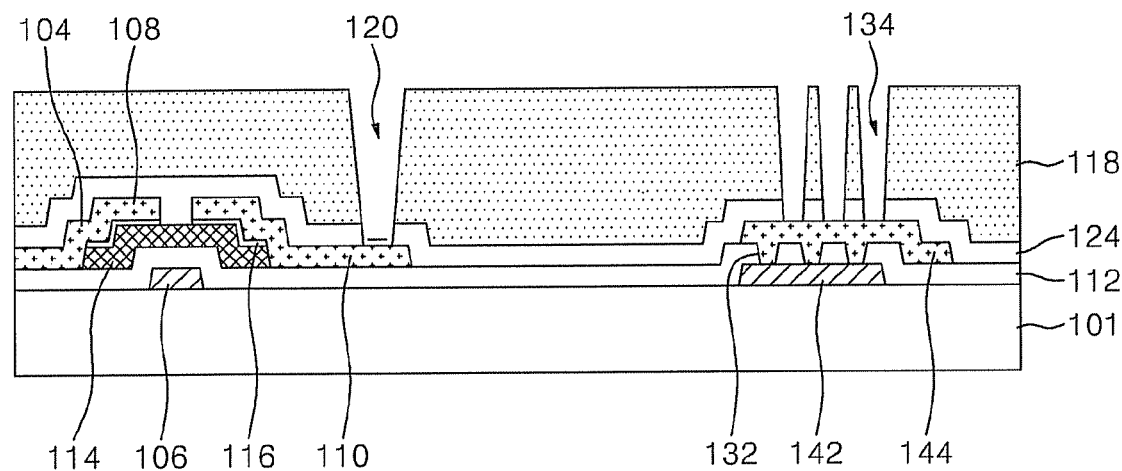

As shown in FIG. 4E, after exposing the active layer 114, an inorganic protection layer 124 and an organic protection layer 118 for covering the source/drain pattern are sequentially deposited over the lower substrate 101. Layers 124 and 118 are then patterned through photolithography and etching processes such that a pixel contact hole 120 for partially exposing the drain electrode 110 and a second common contact hole 134 for partially exposing the intermediate electrode 144 are formed.

The inorganic protection layer 124 is formed by depositing an inorganic dielectric material such as $SiN_x$ and $SiO_x$ on the lower substrate 101 having the source/drain pattern. The organic protection layer 118 is formed by coating an organic dielectric material such as an acrylic resin over the inorganic protection layer 124. The pixel contact hole 120 and the second common contact hole 134 are formed by patterning the inorganic and organic protection layers 124 and 118 such that the drain electrode 110 and the intermediate electrode 144 are exposed.

Figure 4F:
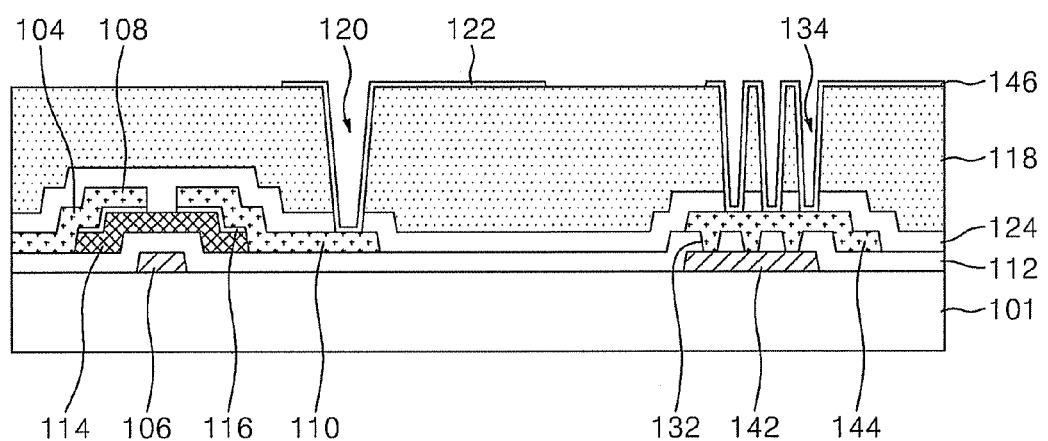

As shown in FIG. 4F, after the pixel contact hole 120 and the second common contact hole 134 are formed, a transparent conductive pattern is formed on the organic protection layer 118, the transparent conductive pattern including a pixel electrode 122 connected to the drain electrode 110 through the pixel contact hole 120 and an upper electrode 146 connected to the intermediate electrode 144 through the second common contact hole 134.

The transparent conductive pattern is formed by depositing a transparent conductive layer on the organic protection layer 118 and then patterning the transparent conductive layer through the photolithography and etching processes. The conductive transparent layer is made, for example, from one of ITO (Indium Tin Oxide), IZO (Indium Zinc Oxide), and ITZO (Indium Tin Zinc Oxide).

Figure 4G:
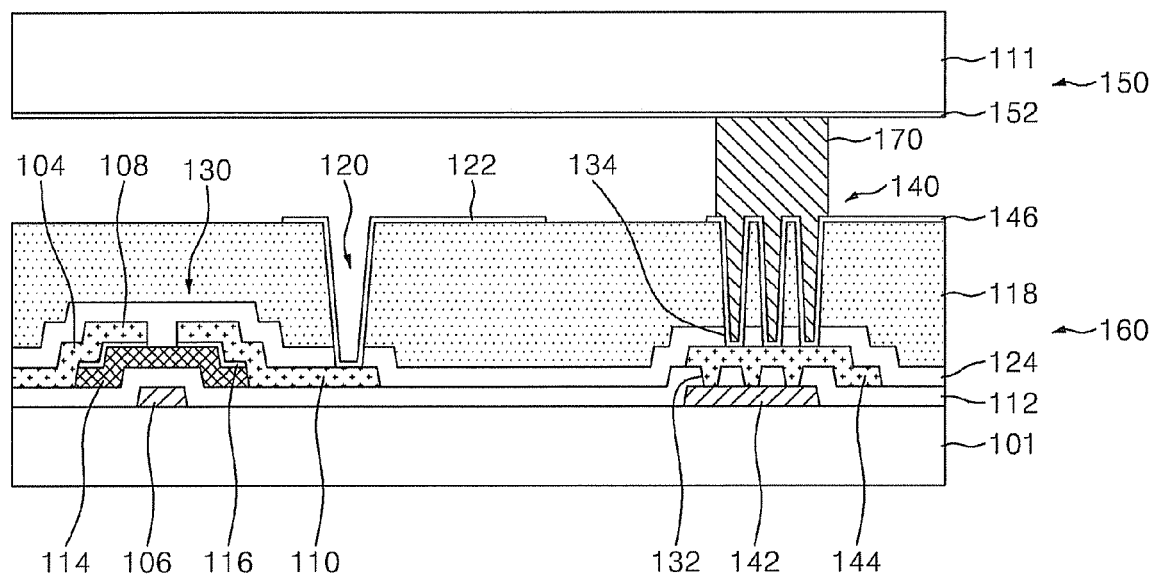

As shown in FIG. 4G, the TFT substrate 160 having the gate pattern, the semiconductor pattern, the source/drain pattern, and the transparent conductive pattern is bonded to the color filter substrate 150 so as to form an LCD panel. The common pad 140 of the TFT substrate 160 is connected to the common electrode 152 of the color filter substrate 150 through the short point 170.

The LCD panel of the present invention embodiments may be adapted to a reflective or transflective LCD device as well as the transmissive LCD device.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the LCD panel and fabricating method thereof according to the preset invention provides a plurality of second common contact holes connecting an intermediate electrode and an upper electrode of a common pad, whereby it is possible to protect the common pad from being cracked and protect the common pad from being eroded by moisture permeating through cracks even when the common pad being cracked.

What is claimed is:

1. A liquid crystal display panel, comprising:
   a common electrode formed on an upper substrate; and
   a common pad formed on a lower substrate facing the upper substrate, the common pad supplying a common voltage to the common electrode through a short point, wherein the common pad further comprises:
   a lower electrode formed on the lower substrate;
   a first common contact hole formed through a gate dielectric layer covering the lower electrode;
   an intermediate electrode connected to the lower electrode through the first common contact hole;
   a plurality of second common contact holes formed through an organic protection layer covering the intermediate electrode; and
   an upper electrode connected to the intermediate electrode through the second common contact holes,
   wherein the plurality of second common contact holes are formed at an area substantially overlapping the short point.

2. The liquid crystal display panel of claim 1, wherein the second common contact holes are formed such that the diameter of at least one of the common second contact holes is smaller than that of the short point.

3. The liquid crystal display panel of claim 2, wherein the organic protection layer is patterned to connect the intermediate electrode and the upper electrode through the plurality of the second common contact holes.

4. The liquid crystal display panel of claim 3, further comprising an inorganic protection layer formed below the organic protection layer, the inorganic protection layer having the same pattern as the organic protection layer.

5. The liquid crystal display panel of claim 1, wherein the first common contact hole comprises a plurality of openings.

6. A method of fabricating a liquid crystal display panel, the method comprising:
   forming a color filter substrate including a common electrode on an upper substrate;
   forming a thin film transistor substrate including a common pad on a lower substrate facing the upper substrate, the common pad having a lower electrode, a first common contact hole formed through a gate dielectric layer covering the lower electrode, an intermediate electrode connected to the lower electrode through the first common contact hole, a plurality of second common contact holes penetrating an organic protection layer covering the intermediate electrode, and an upper electrode connected to the intermediate electrode through the second common contact holes; and
   bonding the color filter substrate to the thin film transistor substrate such that the common electrode is electrically connected to the common pad through a short point.

7. The method of claim 6, wherein the second common contact holes are formed such that the diameter of at least one of the second common contact holes is smaller than that of the short point.

8. The method of claim 7, further comprising forming an inorganic protection layer below the organic protection layer, the inorganic protection layer having the same pattern as the organic protection layer.

9. The method of claim 6, wherein the first common contact hole is formed as a plurality of openings.

10. The method of claim 6, wherein the organic protection layer is patterned to connect the intermediate electrode and the upper electrode through the plurality of the second common contact holes.

11. The method of claim 6, wherein the plurality of second common contact holes are formed at an area substantially overlapping the shot point.

* * * * *